United States Patent
Kato et al.

(10) Patent No.: US 7,240,595 B2
(45) Date of Patent: Jul. 10, 2007

(54) PROCESS FOR PRODUCING MAGNETIC TAPE

(75) Inventors: Shigemi Kato, Kanagawa (JP); Tadashi Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/121,598

(22) Filed: Apr. 15, 2002

(65) Prior Publication Data

US 2002/0149866 A1 Oct. 17, 2002

(30) Foreign Application Priority Data

Apr. 16, 2001 (JP) .............................. 2001-116886

(51) Int. Cl.
B26D 7/14 (2006.01)

(52) U.S. Cl. .............................. 83/18; 83/175; 83/407; 83/436.15; 83/948

(58) Field of Classification Search ................. 83/948, 83/407, 13, 44, 18, 175, 436.15; 242/615.2, 242/548, 525.7; 226/196.1; 427/173, 289–293; 118/34; 162/197, 205; 360/164, 134, 130.31, 360/130.32, 130.21; 428/674 BQ, 694 BA; 26/87, 88, 97, 98, 99; 264/290.2, 167, 280, 264/282, 283, 288.4, 291
See application file for complete search history.

(56) References Cited

U.S. PATENT DOCUMENTS

| | | | | |
|---|---|---|---|---|
| 207,192 A | * | 8/1878 | McLean | 118/34 |
| 2,461,376 A | * | 2/1949 | Feldmeier | 271/274 |
| 3,161,563 A | * | 12/1964 | Waler et al. | 162/197 |
| 3,246,816 A | * | 4/1966 | Dexter et al. | 226/4 |
| 3,294,330 A | * | 12/1966 | Whiteley | 242/352.2 |
| 3,325,857 A | * | 6/1967 | Conti | 26/99 |
| 3,494,525 A | * | 2/1970 | Wiig | 226/11 |
| 4,168,598 A | * | 9/1979 | Omori | 53/433 |
| 4,221,145 A | * | 9/1980 | Shimizu et al. | 83/76.7 |
| 4,404,906 A | * | 9/1983 | Curran | 101/211 |
| 4,438,888 A | * | 3/1984 | Seelinger | 242/530.3 |
| 4,741,922 A | * | 5/1988 | Wales et al. | 427/130 |
| 5,388,513 A | * | 2/1995 | Ohta | 101/228 |
| 5,501,386 A | * | 3/1996 | Kobayashi | 226/190 |
| 5,570,831 A | * | 11/1996 | Takeda et al. | 242/615.12 |
| 5,651,488 A | * | 7/1997 | Goretzky | 226/190 |
| 5,788,797 A | * | 8/1998 | Herrin et al. | 156/73.1 |
| 6,244,145 B1 | * | 6/2001 | Hada et al. | 83/13 |

* cited by examiner

Primary Examiner—Kenneth E. Peterson
Assistant Examiner—Isaac N. Hamilton
(74) Attorney, Agent, or Firm—Sughrue Mion, PLLC

(57) ABSTRACT

A process for producing a magnetic tape is provided, in which a web is extended in the width direction immediately before it is cut by a slitter when the web is supplied to the slitter to be cut into several magnetic tapes. The extension of the web is performed by an extension roller apparatus comprises a backup roller for rolling the web and a pair of horizontally disposed extension rollers which elastically push the web WB at portions near both sides thereof to allow the web for extending in the width direction.

8 Claims, 5 Drawing Sheets

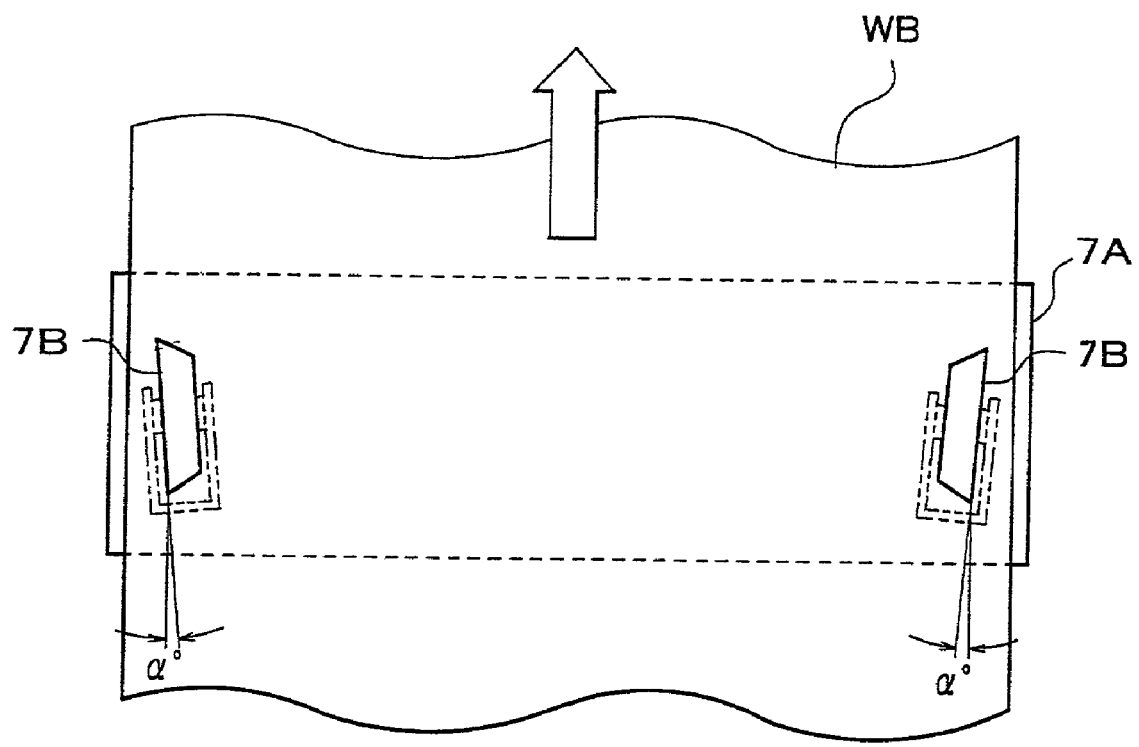

PROCESS FOR PRODUCING MAGNETIC TAPE

BACKGROUND ARTS

1. Field of the Invention

The present invention relates to a process for producing a magnetic tape. More particularly, the present invention relates to a process for producing a magnetic tape suitable for use in backup of data for computer.

2. Description of the Related Arts

In a stage for producing a wide variety of tape for storing backup data of computer represented by cassette tape and videotape, wide raw fabric (hereinafter referred to as "web") wound on a rewinding reel in a bulk state is supplied to a slitter via a plurality of guide rollers, and is cut into magnetic tapes by means of the slitter. Each of cut magnetic tapes is continuously transferred to a winding machine side to be wound on a hub.

Here, it is required for the cassette tape and the videotape that the size of each tape in the width direction should be within the tolerable error level of ±10 µm. On the other hand, in the case of a metal tape for storing backup data of computer, since at least one servo track is recorded on at least one side of the width direction of the tape, it is required that the size of each tape in the width direction should be within the tolerable error level of ±5 µm. Irregardless of the width, a highly precise slitter having an element precision of ±2 µm is used.

However, in spite of using such a highly precise slitter, there occurs the situation in the actual magnetic tape production line where the width size of each of magnetic tapes cut from a portion near the center of the web in the width direction sometimes becomes +8 µm, which largely exceeds the upper limit of the tolerable error level.

SUMMARY OF THE INVENTION

For this reason, we have searched the cause the width size of each of magnetic tapes cut from a portion near the center of the web in the width direction sometimes exceeds the tolerable error level. We have investigated the causes, and as a result, we have found the followings:

In the web wound on the rewinding reel, the thickness at the portion near the center in the width direction is formed into a cross sectional shape such that it is slightly larger than that of portions near both sides. Accordingly, the web wound on the rewinding reel in a bulk state is in a barrel state that the portion near the center in the width direction is slightly swelled, and the diameter of the portion near the center in the width direction is larger than that of the portion near each of both sides. For this reason, as for the pass line of the web from the rewinding reel to the slitter via the plurality of guide rollers onto which the web is rolled, the pass line near the center portion is slightly longer than that of the pass line of the portion near each of both sides, and the tension of the web supplied to the slitter in the portion near the center is slightly decreased in comparison with that in the portion near each of both sides. As a result, at the portion near the center in the width direction, each of the magnetic tapes is deformed toward the width direction, and it has been found that the width greatly exceeds the tolerable error level. In addition, it has been discovered that when the web is extended in the width direction immediately before the web is cut by the slitter, the width size of each of the magnetic tapes can be produced within the tolerable error range of ±5 µm.

According to the present invention, a process for producing a magnetic tape is provided, in which a web is extended in the width direction immediately before it is cut by a slitter when the web is supplied to the slitter to be cut into several magnetic tapes.

According to the process for producing a magnetic tape, since the web is extended in the width direction immediately before it is cut by the slitter, the decreasing of the tension of the web at the portion near the center in the width direction to be supplied to the slitter is dispelled, making the tension of the web in the width direction uniform. As a result, the deformation of each of the magnetic tapes at the time of cutting the web through the slitter can be suppressed, which makes it possible that the width size of each of the magnetic tapes is within the tolerable error level of ±5 µm.

BRIEF DESCRIPTION OF THE DRAWINGS

FIG. 3 is a front view showing the arrangement of the extension roller apparatus, FIG. 4A shows an example of the present invention and FIG. 4B shows a comparative example.

DETAILED DESCRIPTION OF THE INVENTION

Figure 1:
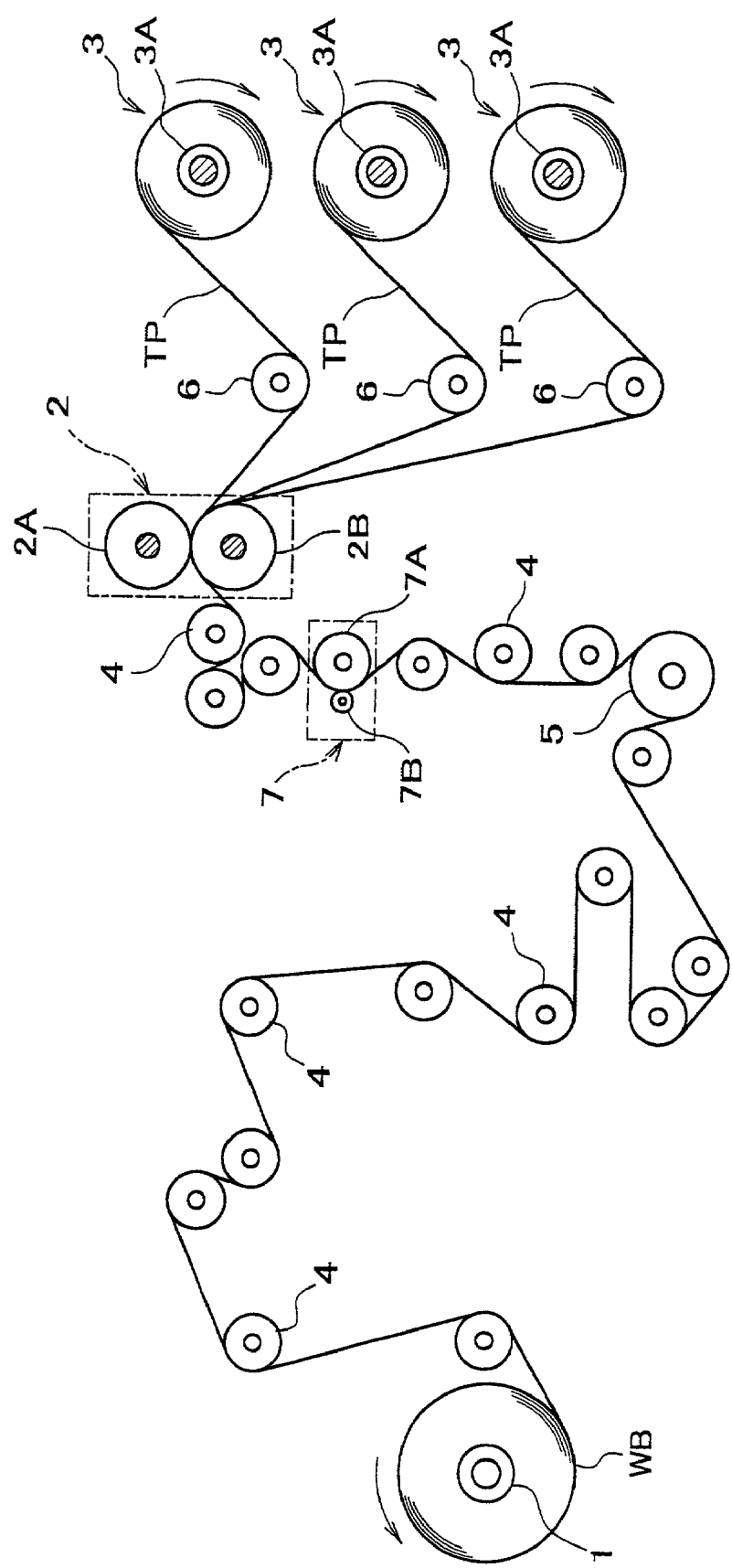
FIG. 1 is a side view schematically showing the production line of the magnetic tape applied to the process for producing a magnetic tape according to the present invention.
Figure 2:
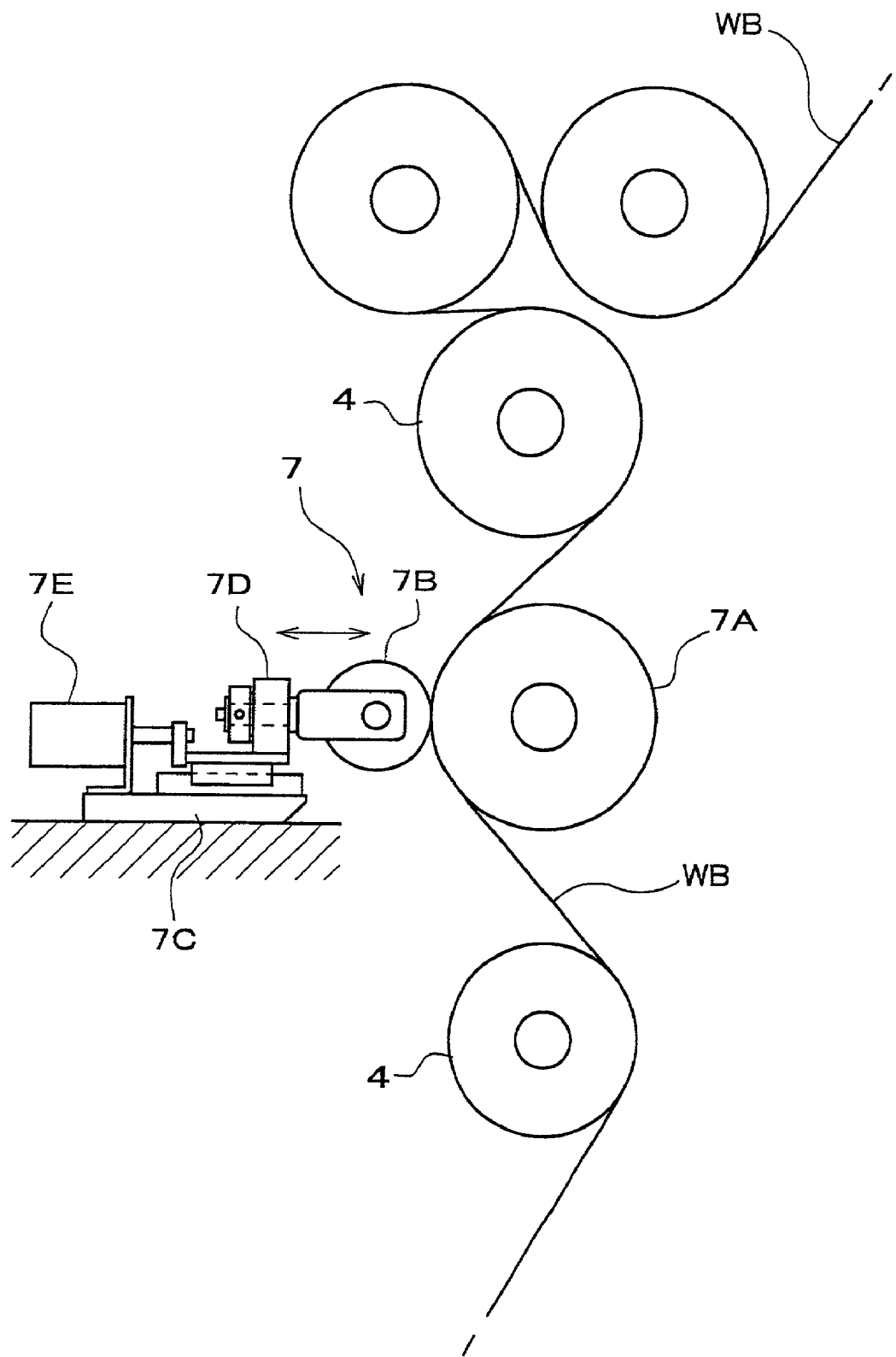
FIG. 2 is a side view showing the outline of the extension roller apparatus shown in FIG. 1.

Embodiments of the present invention will now be described by reference to the attached drawings. FIG. 1 is a side view schematically showing the production line of the magnetic tape applied to the process for producing a magnetic tape according to the present invention, FIG. 2 is a side view showing the outline of the extension roller apparatus shown in FIG. 1, and FIG. 3 is a front view showing the arrangement of the extension roller apparatus.

The process for producing a magnetic tape according to the present invention is applied to a process line shown in FIG. 1. The process line is configured such that a web WB, which is a raw fabric for a magnetic tape wound on a rewinding reel 1 in a bulk state is supplied to a slitter 2 to cut the web WB into several magnetic tapes TP, and the cut tapes TP are continuously wound onto each of winding hub 3A of several winding apparatuses 3, for example, three winding apparatuses 3. In this production line, the web WB rewound from the rewinding reel 1 is rolled on a plurality of guide rollers 4 and a single ground suction drum 5 to be transferred toward the side of the slitter 2. The each of the magnetic tapes TP produced by cutting the web WB by the slitter 2 is rolled on the three tension rollers 6 provided corresponding to the three winding apparatuses 3, and then continuously transferred to each of the winding hubs 3.

Figure 5:
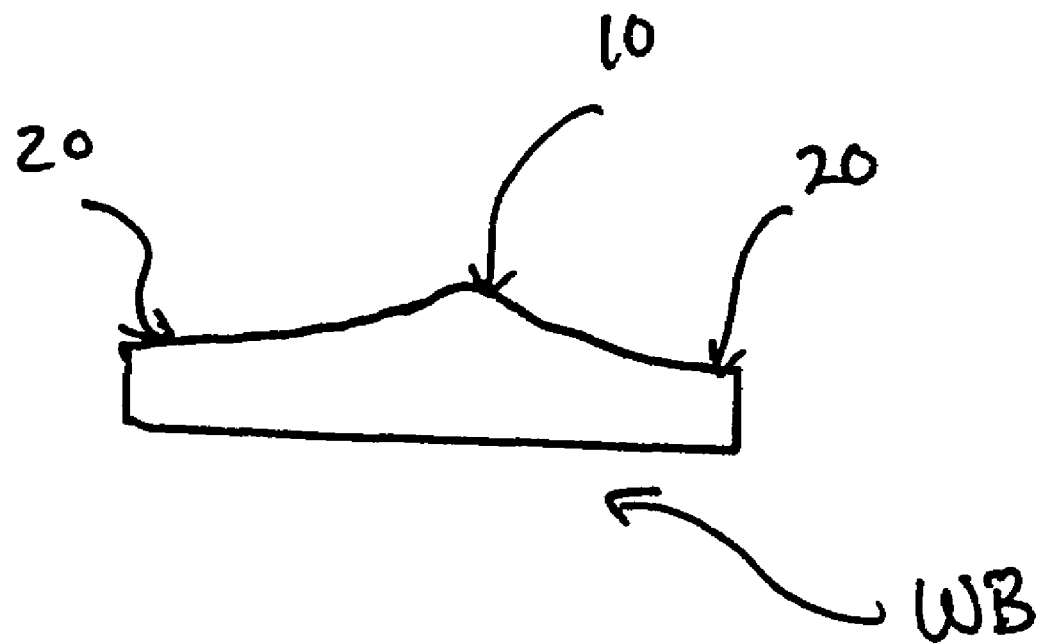
FIG. 5 shows a web having a greater thickness in a central portion.

The web WB comprises a wide base film having a magnetic coat layer formed on the front surface thereof and a back coat layer on the rear surface thereof, and is formed so that the thickness of the central portion 10 in the width direction is slightly thicker than those of both side portions 20 in the width direction in order to prevent the slipped wound of the web onto the rewinding reel 1. FIG. 5, which is a schematic drawing and not drawn to scale, shows a web WB having a thicker central portion 10. For this reason, web WB wound on the rewinding reel 1 in a bulk state is in a barrel state that the portion near the center in the width direction is slightly swelled, and the diameter of the portion near the center in the width direction is 2 mm larger than that of the portion near each of both sides.

The slitter 2 is an apparatus having several pairs of rotating blades 2A and 2B each disposed at a prescribed interval, between which the web WB is introduced for cutting it into a plurality of magnetic tapes TP. For example, the slitter 2 cuts the web WB into 100 to 500 magnetic tapes at a predetermined width of 12.65 mm (½ inch), mm (1 inch) or 3.81 mm. For example, in the case of cutting the web WB into 12.65 mm wide tapes, the slitter 2 has an element precision, which can be cut into tapes within a tolerable error level of ±2 μm.

The ground suction drum 5 rotates with sucking the web WB on the circumference surface thereof in order to define the transfer rate of the web WB. Taking the circumferential speed of the ground suction drum 5 as a standard, the rotation speed of the winding hub 3A of the winding apparatus 3 is controlled.

Here, it should be noted that as for the diameter of the web WB wound on the rewinding roll 1 in a bulk state, the diameter near the center in the width direction is approximately 2 mm lager than that near each of both sides as described previously, in the pass line from the rewinding reel 1 to the slitter 2 via the plurality of guide rollers 4 onto which the web WB is rolled, the pass line near the center portion is slightly longer than that of the pass line of the portion near each of both sides. For this reason, there is a tendency that the tension of the web WB supplied to the slitter 2 in the portion near the center is a slightly decreased in comparison with that in the portion near each of both sides. In the present invention, in order to cancel the decreasing of the tension of the web WB supplied to the slitter 2 in the portion near the center in the width direction and to make the tension of the web WB in the width direction uniform, an extension roller apparatus 7 is provided near the slitter 2.

As shown in FIG. 2, the extension roller apparatus 7 is disposed near the slitter 2 and possesses a backup roller 7A for rolling the web WB and a pair of horizontally disposed extension rollers 7B which elastically push the web WB at portions near both sides thereof to allow the web WB for extending in the width direction. Each of the extension rollers 7B is rotatably supported on a support stand 7D, which is in the front and rear directions along a slide stand 7C, and there is an air cylinder 7E between the slide stand 7C and the support stand 7D. It is configured that when expanding the air cylinder 7E, each of the extension rollers 7B pushes the web WB onto the respective backup roller 7A as shown in FIG. 2, and when contracting the air cylinder 7E, each of the extension rollers is evacuated towards the left direction in FIG. 2 to be separated from the backup roller 7A.

Although the pair of the horizontally disposed extension rollers 7B and 7B may be composed of crown rollers each having a long shaft, they are preferably composed of taper rollers having a short shaft, in which case even at a relatively small contact angle, they can allow the web for extending in the width direction in a sufficient manner. As shown in FIG. 3, the pair of the extension rollers 7B and 7B are disposed opposite each other at portions at the portion near both ends of the circumferential surface of the backup roller 7B in such a manner that the shorter diameters of the rollers symmetrically face each other and the longer diameter of the rollers are engaged with the circumference surface of the backup roller 7B. The circumference of the each of extension rollers 7B is composed of an elastic material such as urethane rubber in order to spread over the web WB by elastically pushing the web WB onto the backup roller 7A. It should be noted that the pair of the extension rollers are disposed in a state that the direction of transferring the web WB is opened in order to spread the web in the width direction at the circumferences of the larger diameter portions thereof (hereinafter referred to as "V shape"). Specifically, the pair of the extension rollers 7B and 7B are disposed in such a manner that each of the rotation face perpendicular to the rotation axis has a contact angle $\alpha^0$ relative to the transferring direction.

The extension roller 7B has the maximum diameter of approximately 40 mm, a width of approximately 15 mm, a taper of approximately 20° in each side. The contact angle $\alpha$ of the extension roller relative to the transferring direction is set ranging from 1 to 5°, and preferably 1 to 3°. The pressure of the extension roller 7B in contact with the backup roller 7A is set ranging from 100 to 2000 g, and preferably from 500 to 1000 g.

In the production line of the magnetic tape constructed as described above (see FIG. 1), the web WB wound on the rewinding reel 1 in a bulk state is rolled on the plurality of guide rollers 4, the ground suction drum 5, the plurality of guide rollers 4, the backup roller 7A of the extension roller apparatus 7, and the plurality of guide rollers 4, on this order, and then supplied to the slitter 2, at which the web WB is introduced between the several pairs of the rotating blades 2A and 2B and is cut into a plurality of magnetic tapes TP. Each of the cut magnetic tapes TP is then rolled on the tension roller 6 and is wound on the winding hub 3A of the winding apparatus 3.

In the stage of producing the magnetic tape TP as described above, the pair of the extension rollers 7B, 7B horizontally disposed in a V shape having the contact angle of $\alpha$ as shown in FIG. 3 is rolled while elastically pushing the web WB at the portions near both horizontal sides, whereby the extension roller 7 provided near the slitter 2 spreads the web WB in the width direction immediately before it is supplied to the slitter 2, making the tension of the web WB supplied to the slitter 2 uniform whereby the decreasing of the tension near the center in the width direction is cancelled. As a result, each of the magnetic tapes TP into which the web WB is cut by the several pairs of the rotating blades 2A and 2B is cut in such a manner that only the width direction thereof is controlled. Consequently, the width of the magnetic tape produced is within the tolerable error level of ±5 μm.

EXAMPLES

As an example, the production line of the magnetic tape having the extension roller apparatus 7 as shown in FIG. 1 was used to cut wide web WB into a plurality of magnetic tapes TP, and the average error in the width direction of the magnetic tapes TP but by the slitter was measured. The width of the web WB was 1000 mm, the width of the magnetic tape TP was 12.65 mm (½ inch), and the transferring rate of the web WB and the magnetic tape TP was 600 m/min. The contact angle $\alpha$ of each of the extension rollers 7B and 7B of the extension roller apparatus was 2°, and the contact pressure thereof was 500 g. On the other hand, the production line of the magnetic tape shown in FIG. 1 except that the extension roller apparatus 7 was excluded was used for comparison to cut wide web WB into a plurality of magnetic tapes TP, and the average error in the width direction of the magnetic tapes TP but by the slitter was measured under the same conditions.

Figure 4A:
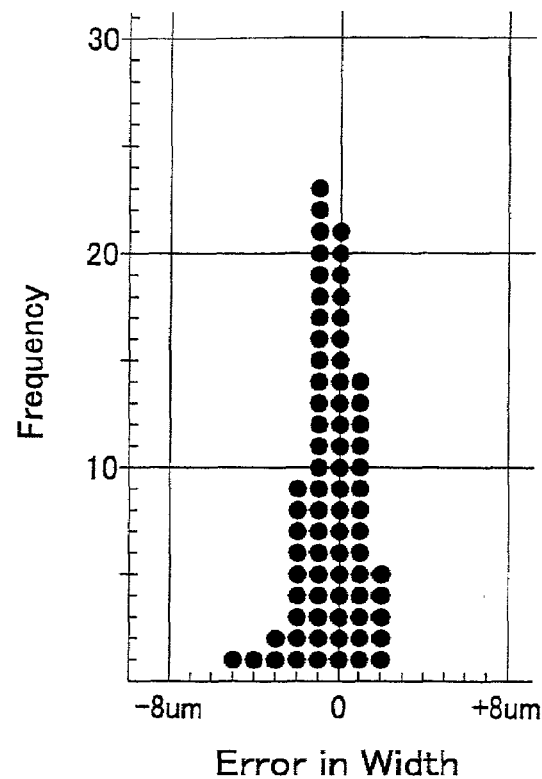
FIGS. 4A and 4B show graphs illustrating the tolerable error level of the width size of the magnetic tape, where
Figure 4B:
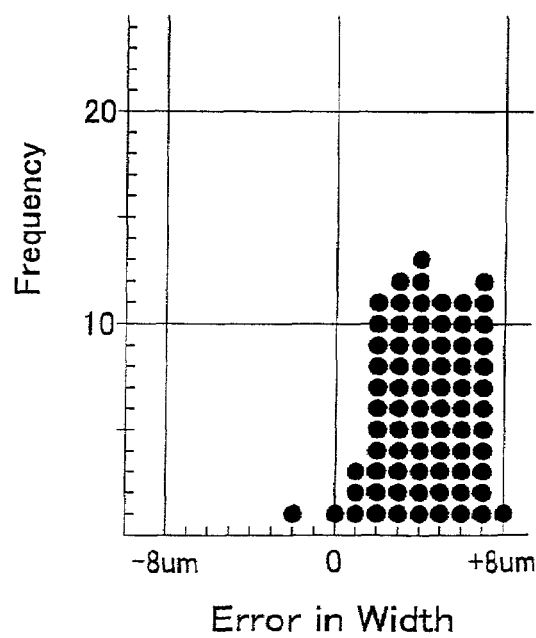

The results measured are shown in FIG. 4. The error range of the cut magnetic tape TP in width direction in Example was from −5 μm to +2 μm, which was converged within the tolerable error level as shown in FIG. 4A. On the other hand, in Comparative Example, it was from −2 μm to +8 μm, indicating that many magnetic tapes exceeding the upper limit of the tolerable error level, which was ±5-6 μm were produced.

What is claimed is:

1. A process for producing a magnetic tape, in which a web having a greater thickness in a central portion is extended in the width direction by a extension roller apparatus comprising a backup roller for rolling the web and horizontally disposed tension rollers which elastically push the web at portions near both sides of the backup roller to allow the web for extending in the width direction before it is cut by a slitter, when the web is supplied to the slitter to be cut into several magnetic tapes, wherein the elastic extension of the web makes a tension of the web substantially uniform in the width direction when the web is supplied to the slitter, and wherein the process is carried out in a production line in which said web wound on a rewinding reel in a bulk state is rolled on a plurality of guide rollers, a ground suction drum, a plurality of guide rollers, the backup roller of the extension roller apparatus, and a plurality of guide rollers, in this order, and then supplied to the slitter, at which the web is introduced between several pairs of rotating blades and is cut into the plurality of magnetic tapes.

2. The process as claimed in claim 1, in which the extension roller apparatus is provided near the slitter.

3. The process as claimed in claim 1, in which each of said tension rollers is rotatably supported on a support stand, which is movable in the front and rear directions along a slide stand, and there is an air cylinder between the slide stand and the support stand.

4. The process as claimed in claim 3, in which each of said tension rollers comprises a taper roller having a short shaft.

5. The process as claimed in claim 3, in which circumferences of larger diameter portions of said tension rollers spread the web in the width direction.

6. The process as claimed in claim 1, wherein the tension rollers are a first roller inclined at a first contact angle relative to a direction of transferring of the web, and a second roller inclined at a second contact angle relative to a direction of transferring of the web.

7. The process as claimed in claim 1, in which circumferences of larger diameter portions of said tension rollers spread the web in the width direction.

8. The process as claimed in claim 6, wherein the first contact angle and second contact angle have a same value, but are inclined in opposite directions.

* * * * *